United States Patent [19]

Wattin

[11] 4,227,569
[45] Oct. 14, 1980

[54] AIR CONDITIONING INSTALLATION

[75] Inventor: Jean-Jacques Wattin, Nogent-le-Rotrou, France

[73] Assignee: Societe Anonyme Francaise du Ferodo, France

[21] Appl. No.: 931,878

[22] Filed: Aug. 8, 1978

[30] Foreign Application Priority Data

Aug. 11, 1977 [FR] France ................. 77 24786

[51] Int. Cl.³ ............................................. G05D 23/00
[52] U.S. Cl. ........................................ 165/35; 165/42; 237/12.3 A
[58] Field of Search ......................... 165/16, 35, 42, 43; 237/12.3 A

[56] References Cited

U.S. PATENT DOCUMENTS 3,802,490  4/1974  Jacobs ............................. 165/23
4,108,376  8/1978  Matsuda et al. ................ 237/12.3 A

FOREIGN PATENT DOCUMENTS 2815012  10/1978  Fed. Rep. of Germany ........... 165/42
2111594   5/1972  France ........................... 237/12.3 A
1073077   6/1967  United Kingdom ................. 237/12.3 A Primary Examiner—Albert W. Davis
Assistant Examiner—Margaret A. Focarino
Attorney, Agent, or Firm—Roylance, Abrams, Berdo & Farley

[57] ABSTRACT

The invention relates to a conditioning installation (heating or cooling) for the air of an enclosure such as the passenger space of a motor vehicle.

The installation comprises a first control means for providing the heating and/or cooling capacity of a heating and/or cooling apparatus at a preset value which is adjustable between first and second limits, and an extra control means for imparting to the capacity of the apparatus the first or second limit value without modifying the preset value when active and for imparting to the capacity the preset value when disconnected. The first control means comprises a sealing shutter capable of pivoting continuously about an axis spaced apart from the radiator between two limit positions. The extra control means comprise a sealing member capable of being placed in a first position sealing off the space separating the free face of the radiator and the shutter axis of the first control means, and in a second position in which it seals off the portion of the duct which is not sealed off by the radiator.

7 Claims, 1 Drawing Figure

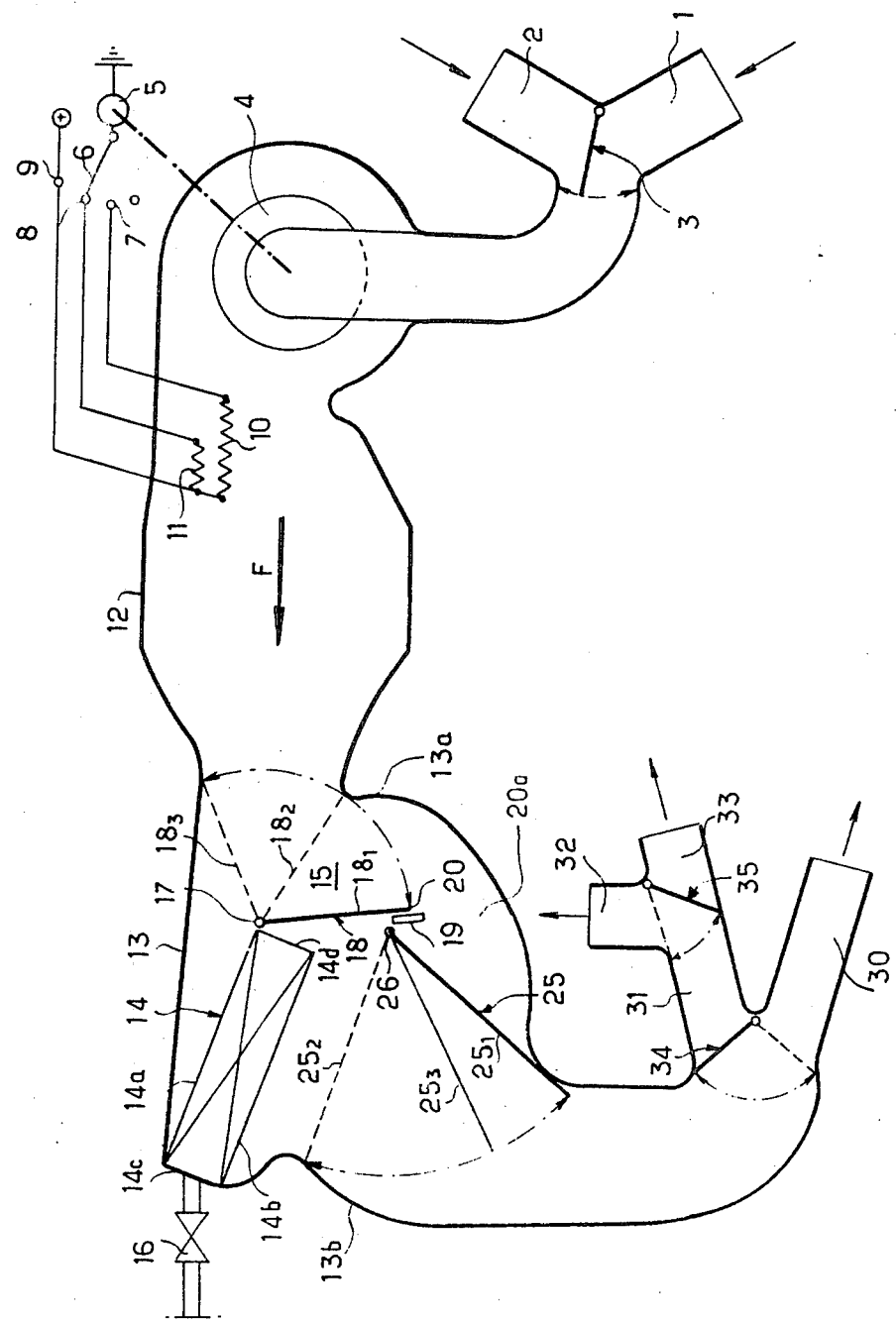

AIR CONDITIONING INSTALLATION

The invention relates to a conditioning installation (heating or cooling) for the air of an enclosure such as the passenger space of a motor vehicle.

It relates more particularly to an installation of said type comprising a duct, means for generating an air stream in said duct, heating or cooling means for the air in said duct, and control means for the heating or cooling power of the air emerging from said duct, said control means being appropriate for imparting to said power a value of some sort adjustable at will, continuously or substantially continuously, between a first and a second limit values.

The object of the invention is to provide such an installation with great operational flexibility.

The installation according to the invention is characterized in that it comprises extra control means for the heating and cooling power. Said extra means are mounted so as to be substituted at will for the first control means in order to impart to said power, in priority, the first or second limit value without changing the setting of the first control means.

In this manner, by acting on the extra control means, it is possible, when need be, to bring said installation to supply temporarily its full heating or cooling power, and this without changing the setting of the usual power control means. This arrangement is usefull particularly when one wishes to temporarily heat to its maximum value the air conditioned by said installation so as to defrost windshields and windows and thereafter come back to the previous heating conditions without having to proceed to a new setting.

In the preferred embodiment of the installation of the invention, it comprises in its duct a heating radiator rigid with (or applied against) walls of the duct and occupying a fraction of the cross-section so as to offer a free face opposite one wall of the duct; in this case, the first control means comprise a sealing shutter, or similar, adapted for continuously pivoting about an axis spaced apart from the radiator between two limit positions corresponding respectively to the first and the second limit values of the heating power and the extra control means comprise a sealing member such as a shutter adaptable for being placed according to a first position in which it seals off the space separating the free face of the radiator from the shutter axis of the first control means, and according to a second position in which it seals off the duct portion which is not sealed off by the radiator. When the sealing member is in its first position, the extra control means have no effect and the heating power depends only on the position of the sealing shutter of the first control means. When the sealing member of the extra control means is in its second position, the installation supplies the maximum heating power whatever the position of the sealing shutter of the first control means.

Further characteristics of the invention will become apparent from the following description of one of its embodiments, made with reference with the accompanying drawing wherein the sole FIGURE shows schematically an air conditioning installation according to the invention.

The embodiment which is shown in the FIGURE is an air conditioning installation for the passenger space of a motor vehicle.

Said installation is in the form of an assembly of ducts comprising two air inlets 1 and 2. The inlet 1, so-called "re-cycling" inlet, is connected to the inside of the motor vehicle passenger space (not shown) and the inlet 2 is connected to the outside of said vehicle. A pivoting shutter 3 allows supplying the installation from inlet 1 and/or inlet 2. The air introduced through inlet 1 and/or inlet 2 is sucked by a ventilator 4 driven by an electric motor 5 which, in the example, is supplied in continuous current and can rotate at three distinct speeds according to whether slider 6 is connected to one of three contact studs 7, 8 or 9. Between studs 7 and 9 is arranged a resistor 10 and between studs 8 and 9 is a resistor 11 of lower resistance than that of resistor 10. Stud 9 is connected to the positive terminal (+) of a D.C. source (not shown). The motor 4 rotates then at its highest speed when slider 6 is connected to stud 9 and at its lowest speed when the slider is connected to stud 7. In order to cool down resistors 10 and 11, said resistors are arranged in the portion of the installation duct 12 which is, relative to the direction of the air stream F, downstream of ventilator 4. Duct 12 is continued by a duct 13 in which is installed, on part of its cross-section, a heating and/or cooling apparatus 14, e.g., a heating radiator. The latter has two parallel main walls 14a and 14b through which the air stream may flow and which are spaced apart by side walls 14c, 14d through which the air cannot flow. A side wall 14c is in contact with a wall 13b of duct 13, and a side wall 14d, parallel to wall 14c, is arranged in a central portion of duct 13 so that a free space 15 is made available between said wall 14d and a wall 13a of duct 13.

The other side walls of radiator 14 are also in engagement with the respective walls of duct 13. Said walls are in the front or in the back relative to the plane of the figure.

The portion of duct 13 defined by a plane parallel to walls 14a and 14b has two well separated portions, viz. the one occupied by radiator 14 and the one occupied by the free space 15.

Radiator 14 is provided with a hot water inlet spigot 16. Said spigot 16 is, in the example shown, of the "all-or-none" type.

The pivoting axis 17 of a pivoting shutter 18 is arranged in the vicinity of the edge formed by the intersection of walls 14a and 14d of radiator 14. Said shutter 18 is mounted so as to be placed at will in any one of the three positions $18_1$, $18_2$ and $18_3$ shown in the FIGURE. The shape and dimensions of said shutter are such that in one of said positions ($18_2$), it seals off completely the space 15 between walls 13a and 14d.

In position $18_1$ (shown in solid line in the FIGURE), the shutter 18 engages an abutment 19, and a free space 20a is provided between the free end 20 of said shutter and wall 13a.

In position $18_3$, the shutter 18 forms a screen interposed between face 14a of the radiator and the air stream F.

In duct 13 is also arranged a second pivoting shutter 25. The axis 26 of said shutter 25 is spaced apart from radiator 14, in the vicinity of abutment 19, viz. in the vicinity of the free end 20 of shutter 18 when the latter is in the position $18_1$. Moreover, the axis 26 is substantially parallel to axis 17.

The shutter 25 may be placed in any position between two limit positions $25_1$ (shown in solid line) and $25_2$ (shown in interrupted line).

In position $25_1$, shutter 25 seals off the section of duct 13 which is between wall 13a and abutment 19. In position $25_2$, the shutter 25, which is parallel to wall 14b of radiator 14, seals off the portion between said abutment 19 and the wall 13b opposite wall 13a.

Finally, two outlet ducts 30 and 31 are connected to duct 13. Duct 30 is provided for the general heating of the vehicle passenger space. Duct 31 is separated into two outlet ducts, respectively 32 and 33.

Shutters 34 and 35 allow at will to drain the air which has flown through the installation towards one and/or the other of said outlet ducts 30, 31, 32 or 33. Duct 33 emerges at the level of the vehicle windows in view of their defrosting and duct 32 has an outlet forming an extra heating or ventilation nozzle.

For controlling the displacement of the pivoting shutter 25, there is provided, in a manner known per se, a control member (not shown) on the instrument board of the vehicle and a cable (also not shown) of the Bowden type connecting said control member with shutter 25. For the displacement of shutter 18, there is foreseen a jack (not shown) and control means for instance of the push-button type on the instrument board of the vehicle.

Although this is inferred from the preceding description, it should be stressed however that shutters 18 and 25, abutment 19 and radiator 14 extend over the whole space between the side walls of the ducts in which they are disposed, said side walls being parallel to the plane of the FIGURE.

The operation of the installation which is shown in the FIGURE is as follows:

The shutter 18 is most of the time in position $18_1$. In this case, it is the position of shutter 25 which determines the heating power of the installation. In position $25_1$, the air from duct 12 flows entirely through radiator 14, from face 14a to face 14b. This position corresponds therefore to the maximum heating position.

In position $25_2$ of shutter 25, the air current from ventilator 4 which flows through radiator 14 is stopped by shutters 25 and 18. The air current can therefore flow towards the outlet only through spaces 15 and 20a; in this case, the installation supplies only fresh air and no heated air.

When shutter 25 is in the intermediate position, for instance in position $25_3$ shown in thin line in the FIGURE, the air stream F is divided into two portions. The first one flows through radiator 14 and the second through spaces 15 and 20a. The heating power is delivered by the installation depends then on the position of shutter 25 and said power may be set to any desired value between a lower limit corresponding to position $25_2$ and an upper limit corresponding to position $25_1$ of shutter 25.

If it is desired to obtain "in priority" hot air without modifying the so-called "comfort" position of shutter 25, shutter 18 is brought to position $18_2$. In said conditions, the installation supplies the maximum heating power, whatever the position of shutter 25. Actually, in this case, the air stream generated by ventilator 4 flows only through radiator 14. Moreover, shutter 25 cannot stop the exhaust of heated air towards the installation outlet. In particular, when said shutter 25 is in position $25_2$, the heated air can be directed towards the installation outlet by flowing through the free space 15, then through space 20a which is between abutment 19 and the wall 13a.

Where it is desired, also as a "priority", to obtain fresh air without modifying the position of shutter 25, shutter 18 is brought to position $18_3$; under such conditions, the air generated by ventilator 4 cannot flow through radiator 14. Thus, whatever the position of shutter 25, the installation supplies only fresh air and no heated air. Moreover, and as in the previous case, shutter 25 does not oppose, whatever its position, the passage of the air current. For instance, if shutter 25 is in an intermediate position, the air flux F is divided into two portions separated by said shutter 25.

It will be appreciated that with the combination of shutters 18 and 25, it is possible to inject temporarily hot air or fresh air without modifying the previous setting of the heating power; thus, it is possible to revert to the so-called "comfort" previous heating position without having to fumble for finding said position.

What is claimed is:

1. An air conditioning installation for an enclosure, such as the passenger space of a motor vehicle, comprising heating and/or cooling apparatus having a heating and/or cooling capacity;

first control means, for said heating and/or cooling capacity of said apparatus, for providing said capacity at a preset value which is substantially continuously adjustable between first and second limit values; and extra control means, for said heating and/or cooling capacity of said apparatus, for imparting to said capacity said first or second limit value without modifying said preset value of said first control means when active, and for imparting to said capacity said preset value of said first control means when disconnected.

2. An air conditioning installation according to claim 1, wherein said apparatus comprises a heating radiator.

3. An air conditioning installation according to claim 1, further comprising a duct having walls, said apparatus has a free face and is coupled to walls of said duct to occupy a portion of the cross section of said duct and to present said free face opposite one wall of said duct;

wherein said first control means comprises a sealing shutter pivotably mounted in said duct for substantially continuous movement about a first axis spaced from said apparatus and between two limit positions corresponding to said first and second limit value, respectively; and wherein said extra control means comprises a sealing member mounted in said duct for movement between a first position in which said sealing member seals off the space between said free face of said apparatus and said first axis of said first control means and a second position in which said sealing member seals off the remaining portion of said duct not sealed by said apparatus.

4. An air conditioning installation according to claim 3, wherein said sealing member of said extra control means is also mounted for movement to a third position in which said sealing member prevents air from flowing through said apparatus.

5. An air conditioning installation according to claim 4, wherein said sealing member of said extra control means comprises a second shutter pivotally mounted in said duct about a second axis located adjacent said free face of said apparatus and substantially parallel to said first axis of said sealing shutter of said first control means.

6. An air conditioning installaction according to claim 3, wherein said sealing member of said extra control means comprises a second shutter pivotally mounted in said duct about a second axis located adjacent said free face of said apparatus and substantially parallel to said first axis of said sealing shutter of said first control means.

7. An air conditioning installation according to claim 3, further comprising a generating means for developing an air stream through said duct.

* * * * *